(12) United States Patent  
Grosberg

(10) Patent No.: US 7,063,166 B1
(45) Date of Patent: Jun. 20, 2006

(54) EARTH GROOMING DEVICE

(75) Inventor: Michael T. Grosberg, Chico, CA (US)

(73) Assignee: Country Home Products, Inc., Vergennes, VT (US)

( * ) Notice: Subject to any disclaimer, the term of this patent is extended or adjusted under 35 U.S.C. 154(b) by 0 days.

(21) Appl. No.: 11/149,260

(22) Filed: Jun. 10, 2005

(51) Int. Cl.
*A01B 49/02* (2006.01)
*A01B 63/32* (2006.01)

(52) U.S. Cl. .................. 172/200; 172/197; 172/620; 172/662; 172/395; 172/407

(58) Field of Classification Search .............. 56/1, 56/370, 371; 172/197, 198, 199, 200, 395, 172/407, 425, 426, 427, 620, 662, 684.5
See application file for complete search history.

(56) References Cited

U.S. PATENT DOCUMENTS

| | | | | |
|---|---|---|---|---|
| 277,029 A | | 5/1883 | Harter ...................... 172/150 |
| 1,184,622 A | | 5/1916 | Clarkson ................... 172/393 |
| 1,393,385 A | | 10/1921 | Lyttle et al. ............. 172/684.5 |
| 4,212,254 A | * | 7/1980 | Zumbahlen ................ 111/52 |
| 4,217,962 A | | 8/1980 | Schaefer ................... 172/197 |
| 4,361,191 A | * | 11/1982 | Landoll et al. ............ 172/146 |
| 4,898,247 A | | 2/1990 | Springfield ............. 172/799.5 |
| 5,289,880 A | * | 3/1994 | Barto ..................... 172/799.5 |
| 5,409,068 A | * | 4/1995 | Hake et al. ................ 172/196 |
| 5,529,131 A | * | 6/1996 | Van Ornum ................ 172/789 |
| 5,535,832 A | * | 7/1996 | Benoit ..................... 172/195 |
| 6,000,476 A | * | 12/1999 | Gall ....................... 172/196 |
| 6,119,792 A | * | 9/2000 | Almer .................... 172/799.5 |
| 6,615,929 B1 | * | 9/2003 | Heckendorf ............. 172/799.5 |
| 6,840,332 B1 | * | 1/2005 | Winger ..................... 172/199 |
| 2005/0150668 A1 | * | 7/2005 | Williamson ............... 172/297 |

* cited by examiner

*Primary Examiner*—Thomas B. Will
*Assistant Examiner*—Alexandra Pechhold
(74) *Attorney, Agent, or Firm*—Mattingly, Stanger, Malur & Brundidge, P.C.

(57) ABSTRACT

An earth grooming device for attachment to a vehicle includes a rectangular frame having a plurality of teeth secured to the front thereof to form a rake and a scraper blade secured to the rear of the frame. A side rail is attached to each side of the frame with each side rail having a bottom edge tapered forwardly and upwardly beginning from a point intermediate both ends of the side rail where a bottom edge of the scraper blade is positioned and tapered rearwardly and upwardly from the point to form a fulcrum about which the side rail pivots. A pair of rear wheels are mounted adjacent the ends of the side rail and a pair of adjustable wheels are mounted intermediate of the frame. Actuator means are also provided for adjusting a height of the pair of adjustable wheels relative to the frame.

6 Claims, 4 Drawing Sheets

EARTH GROOMING DEVICE

BACKGROUND OF THE INVENTION

1. Field of the Invention

The present invention relates to an earth grooming device and, more particularly, to an earth grooming device adapted for attachment to a pulling vehicle and having a scarifying tooth front rake and a rear leveling and scraper blade mounted on a wheeled frame.

2. Description of the Prior Art

There are many earth leveling and grading devices generally comprising a scraper blade and are either drawn by a vehicle or are self propelled and are used in large scale operations such as the construction of a road or a highway and are commonly known as graders. There also are smaller earth leveling and grading devices which include scarifying teeth in combination with a scraper blade which may be either self-propelled or are adapted to be pulled by a vehicle and are used for smaller operations such as grooming driveways and country roads and grooming athletic fields constructed of earth such as the infield of a baseball diamond. Two examples of such smaller vehicle attached leveling and grading devices are shown in U.S. Pat. Nos. 4,217,962 and 4,898,247.

While such devices are generally satisfactory, a need still exists for a simple earth grooming device which is of simple construction and easily adjustable for different leveling or grooming operations.

SUMMARY OF THE INVENTION

It is an object of the present invention to provide an earth grooming device for attachment to a vehicle and which has a wheeled frame mounting a front scarifying toothed rake and a rear scraper and leveling blade.

A further object of the invention is to provide an earth grooming device for attachment to a pulling vehicle having a scarifying tooth rake and a scraper and leveling blade in which the height of the rake is readily adjustable while the blade maintains contact with the earth.

Another object of the invention is to provide an earth grooming device for attachment to a vehicle which is of simple construction and adapted for use in smaller leveling and grooming earth applications.

The present invention achieves the above and other objects by providing an earth grooming device for attachment to a vehicle wherein the device includes a rectangular frame having a front beam, a rear beam and a pair of opposed side beams connecting the front and rear beams. A plurality of scarifying teeth are secured to the front beam and a scraper and leveling blade is secured to the rear beam of the frame. The device further includes a side rail secured to each side beam with each side rail having a bottom edge tapered forwardly and upwardly beginning from a point intermediate both ends of the side rail where the scraper blade is mounted to the rear beam and tapered rearwardly and upwardly from the point to form a fulcrum about which the side rail pivots to cause the frame to pivot upwardly and downwardly. A pair of spaced rear wheels are mounted adjacent the rear ends of the side rails and another pair of adjustable wheels are mounted intermediate of the front and rear beams of the frame to a rotatable axle extending between the side beams. Suitable means such as an electric actuator are provided for adjusting the height of the pair of adjustable wheels by rotating the axle to which the wheels are connected. The scraper blade is mounted at an angle whereby the bottom edge of the blade is angled forwardly so that it is more forward than the top edge of the blade.

These and other features and advantages of the present invention will become more apparent with reference to the following detailed description and drawings.

DETAILED DESCRIPTION OF THE PREFERRED EMBODIMENT

Figure 1:
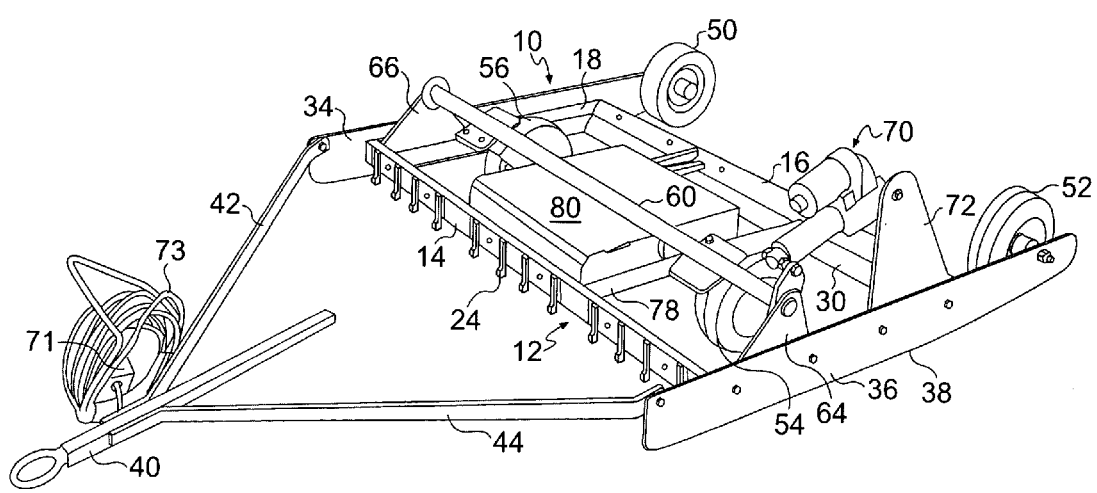
FIG. 1 is a prospective view of an earth grooming device according to the present invention.

Illustrated in the drawings is an earth grooming device 10 adapted to be towed by a small vehicle such as a garden tractor, a riding mower, an ATV, a three point hitch utility tractor and the like. Preferably the small vehicle should have at least ten horse power.

The earth grooming device includes a rectangular frame 12 having a front beam 14, a rear beam 16 and a pair of opposed side beams 18, 20 connecting the front and rear beams.

Figure 3:
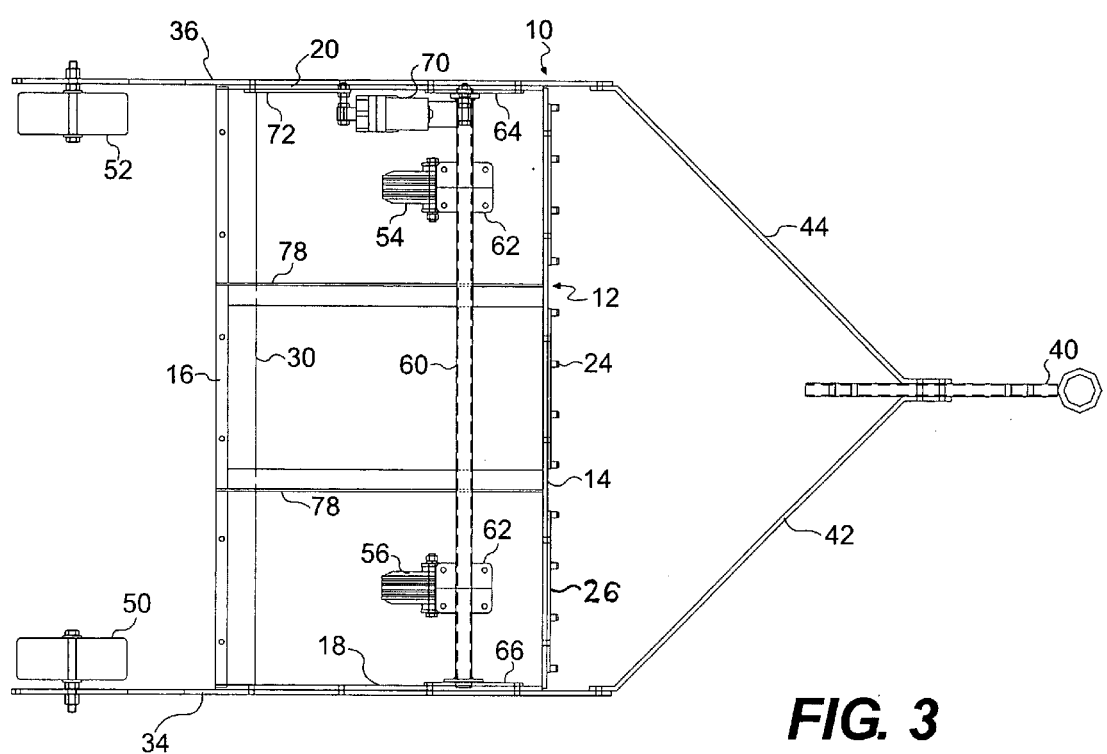
FIG. 3 is a top plan view of the earth grooming device of the present invention.
Figure 4:
FIG. 4 is a top view of a side rail of the earth grooming device of the present invention.

A plurality of carbide tipped teeth 24 are mounted to tooth bars 26 which, in turn, are secured to the front beam 14 by any suitable means such as bolts and nuts whereby the tooth bars may be removed when necessary. Moreover, the tooth bars 26 preferably have elongated vertical slots through which the bolts extend so that the tooth bars may be adjusted upwardly and downwardly with respect to the front beam to adjust the position of the teeth. As shown in FIG. 3, three tooth bars 26 are mounted to the front beam 14 and four carbide tipped teeth 24 are attached to each tooth bar. The teeth form a rake whereby when the teeth are lowered they penetrate the ground from zero to one inch to scarify or rip the soil in order to loosen the top thereof.

A scraper and leveler blade 30 is removably secured to the rear beam 16 by suitable means such as nuts and bolts. The blade 30 may be provided with elongated vertical slots through which the bolts extend so that the blade may be adjusted upwardly or downwardly with respect to the rear beam. The scraper blade preferably is mounted at an angle of approximately sixty degrees measured upwardly from a horizontal plane whereby a bottom edge of the scraper blade is more forward then a top edge of the blade.

Figure 2:
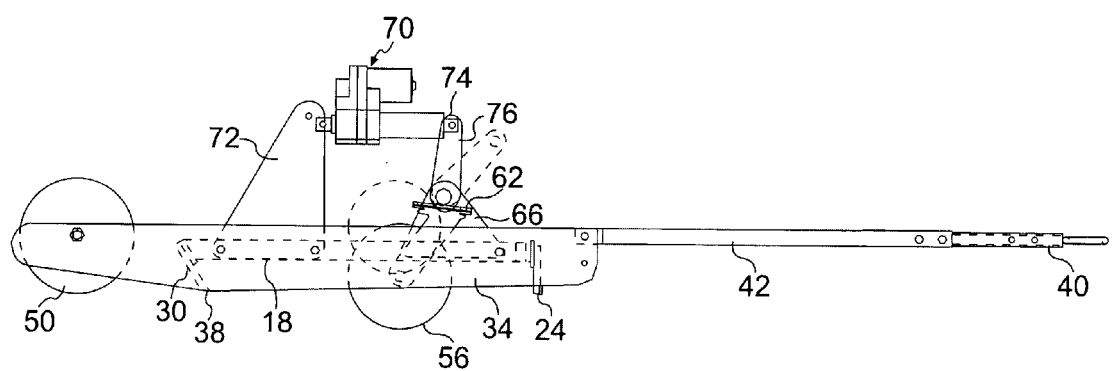
FIG. 2 is a right side view of the earth grooming device shown in FIG. 1.
Figure 5:
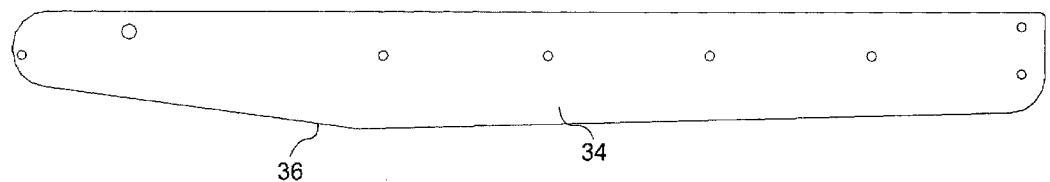
FIG. 5 is a side elevational view of the side rail shown in FIG. 4.

A first side rail 34 is secured to side beam 18 on the right side of the grooming device and a second opposed side rail 36 is secured to the side beam 20 on the left side of the grooming device. As shown in FIGS. 2 and 5, each of the side rails 34, 36 has a fulcrum 38 located approximately two-thirds of the length measured from the front of the rail and approximately one-third of the length measured from the rear of the rail. As shown in FIG. 2, the bottom edge of the scraper blade 30 is positioned at the fulcrum 38 of each side rail. The fulcrum 38 on each side rail serves as a pivot point about which the side rail pivots. Since the bottom edge of the scraper blade 38 is at the exact fulcrum or pivot point of each side rail, the bottom of the blade stays at the same height as the side rails pivot up and down on a surface when the bottom of the blade is in contact with the surface.

A draw bar 40 for attachment to a pulling vehicle is attached to the frame through the side arms 34 and 36 by a right draw bar arm 42 and a left draw bar arm 44. Each of the draw bar arms are pivotly connected to one of the side rails so that the draw bar and the draw bar arms may be pivoted upwardly and downwardly. The draw bar arms are both angled inwardly from the respective side rails so that they contact and are attached to the draw bar.

A right rear wheel 50 is attached adjacent a rear end of the side rail 34 and a left rear wheel 52 is attached adjacent a rear end of the side rail 36.

A left front adjustable caster wheel 54 and a right front adjustable caster wheel 56 are mounted to a rotatable axle 60 extending across the width of the frame 12. Each caster wheel is swivel mounted to a supporting bracket assembly 62 fixedly secured to the axle 60. The axle 60 is rotatably supported at its left end by an upstanding triangular shaped bracket 64 mounted to side beam 20 and side rail 36 and is rotatably supported at its right end by an upstanding triangular shaped bracket 66 attached to side beam 18 and side rail 34. The caster wheels 54 and 56 as well as the rear wheels 50 and 52 preferably are puncture proof.

The axle 60 is rotated by an electric actuator, generally indicated by the numeral 70, pivotly mounted adjacent the upper portion of an upstanding triangular bracket 72 mounted to the side beam 20 and side rail 36 at the left hand side of the grooming device. The electric actuator may be comprised of an electric motor which rotates a gear which in turn rotates a rod to extend and retract the rod causing the axle to rotate upwardly or downwardly. The outer end of the rod 74 is pivotly attached to an upper end of a crank arm 76 which in turn is rotatably attached to the upper portion of right triangular shaped bracket 66.

When the electric motor is actuated to rotate in one direction, the rod 74 is extended to move the crank arm 76 forwardly to a position shown in dotted lines in FIG. 2 whereby the axle 60 rotates to move the caster wheels 54 and 56 upwardly to a position where the wheels do not touch the ground. The upward position of the wheel 56 is also shown in dotted lines. When the electric motor is rotated in an opposite direction, the rod retracts to its normal position as shown in full lines in FIG. 2 wherein the caster wheels are in a down position where they touch the ground.

The electric motor preferably is at least a 12 volt motor that is connected to a twelve volt power system on a pulling vehicle or to a twelve volt battery. The electric motor may be connected to a toggle switch 71 by an electric cord 73 shown at the front of the grooming device in FIG. 1. The toggle switch may be secured to a pulling vehicle or may be left loose so as to be portable. While an electric actuator is preferred, a suitable hydraulic or other mechanical type of actuator may be used.

The caster wheels 54 and 56 may be raised whereby the frame 12 and the parts attached thereto are lowered until the rear wheels 50 and 52 touch the ground and the fulcrums 38 of the side rails along with the bottom edge of the scraper blade 30 touch the ground. The height of the caster wheels 54 and 56 may be adjusted so that the teeth 24 penetrate into the ground from zero to one inch while the rear scraper blade stays in a stationary position at ground level to level the earth.

The grooming device also may be provided with a pair of spaced middle frame members 78 constructed of metal angle irons having a lip extending inwardly which form a sub-frame for holding weights 80 for adding weight to the grooming device. The frame members preferably are spaced a standard length apart such as sixteen inches to accommodate the length of a standard brick size wherein sixteen inch bricks can be used as weights.

In operation of the earth grooming device of the present invention, when the device is being transported, the caster wheels 54 and 56 are in a lowered position as shown in FIG. 2, whereby the teeth 24 and the bottom of the scraper blade 30 are out of contact with the earth while all four wheels 50, 52, 54 and 56 are in contact with the earth or other supporting surface. When it is desired to use the device for grooming the earth, the caster wheels are moved to an upward position whereby the rear wheels 50 and 52 continue to contact the ground along with the bottom edge of the scraper blade 30 and the fulcrums 38 of the side rails and, if desired, the ends of the teeth 24. By adjusting the height of the caster wheels 54 and 56, it is possible to rotate the frame around the fulcrums 38 on the side rails whereby the teeth may penetrate the ground from zero to one inch to scarify or loosen the soil whereupon the scraper blade 30 levels the soil. Since the bottom of the scraper blade 30 is located at the fulcrum 38 of each of the side rails, the blade stays in contact with the ground as the frame pivots about the fulcrums 38.

Numerous other modifications and adaptations of the present invention will be apparent to those skilled in the art and thus, it is intended by the following claims to cover all such modifications and adaptations which fall within the true spirit and scope of the invention.

The invention claimed is:

1. An earth grooming device for attachment to a vehicle comprising:
   a) a frame having a front beam, a rear beam and a pair of opposed side beams connecting said front and rear beams;
   b) a plurality of teeth secured to said front beam;
   c) a scraper blade secured to said rear beam;
   d) a side rail secured to each side beam, each said side rail having a bottom edge tapered forwardly and upwardly beginning from a point intermediate both ends of said side rail where a bottom edge of said scraper blade is positioned and taped rearwardly and upwardly from said point to form a fulcrum about which said side rail pivots;
   e) a rear wheel mounted adjacent a rear end of each of said side rails;
   f) a pair of adjustable wheels mounted intermediate of said front and rear beams; and
   g) means for adjusting a height of said pair of adjustable wheels relative to said frame.

2. An earth grooming device according to claim 1, which further comprises an axle extending between said side beams to which said pair of wheels are mounted.

3. An earth grooming device according to claim 2, wherein said means for adjusting a height of said wheels comprises an actuator connected to said axle.

4. An earth grooming device according to claim 3 wherein said actuator comprises an electrical actuator.

5. An earth grooming device according to claim 2, wherein each of said pair of wheels is swivel mounted to said axle.

6. An earth grooming device according to claim 1, wherein said blade is mounted at an angle whereby a bottom edge of said blade is more forward than a top edge of said blade.

* * * * *